United States Patent
Kovacic et al.

(10) Patent No.: US 10,049,237 B2
(45) Date of Patent: Aug. 14, 2018

(54) RADIO-FREQUENCY IDENTIFICATION TRANSPONDER AND METHOD FOR SENDING A RADIO-FREQUENCY IDENTIFICATION MESSAGE

(71) Applicant: STMicroelectronics International N.V, Schiphol (NL)

(72) Inventors: Kosta Kovacic, Orehova vas (SI); Albin Pevec, Ljubljana (SI); Maksimiljan Stiglic, Maribor (SI)

(73) Assignee: STMicroelectronics International N.V., Schiphol (NL)

( * ) Notice: Subject to any disclaimer, the term of this patent is extended or adjusted under 35 U.S.C. 154(b) by 0 days.

(21) Appl. No.: 15/473,074

(22) Filed: Mar. 29, 2017

(65) Prior Publication Data
US 2017/0300723 A1  Oct. 19, 2017

(30) Foreign Application Priority Data
Apr. 14, 2016 (EP) ..................................... 16165320

(51) Int. Cl.
*G06K 7/10* (2006.01)
*G06K 19/07* (2006.01)

(52) U.S. Cl.
CPC ..... *G06K 7/10009* (2013.01); *G06K 19/0723* (2013.01)

(58) Field of Classification Search
CPC .................. G06K 7/10009; G06K 19/0723
See application file for complete search history.

(56) References Cited

U.S. PATENT DOCUMENTS

| | | |
|---|---|---|
| 2013/0003712 A1 | 1/2013 | Kunc et al. |
| 2013/0288599 A1 | 10/2013 | Bernard et al. |
| 2013/0321230 A1* | 12/2013 | Merlin ............... H01Q 1/2225 343/787 |
| 2015/0347892 A1 | 12/2015 | Kunc et al. |

FOREIGN PATENT DOCUMENTS

EP  2988427 A1  2/2016

OTHER PUBLICATIONS

"EMV Contactless Specification for Payment Systems," Book D, EMV Contactless Communication Protocol Specification, Version 2.3, Feb. 2013, 241 pages.

* cited by examiner

*Primary Examiner* — Leon Flores
(74) *Attorney, Agent, or Firm* — Slater Matsil, LLP (57) ABSTRACT

Embodiments provide a method for sending a message from an RFID transponder to a reader during a transmission frame using active load modulation, the method comprising. An encoded bit signal has a first logic level during first time segments within the transmission frame and a second logic level during second time segments within the transmission frame. The first time segments include an initial time segment of the transmission frame. A transmission signal is generated based on the encoded bit signal. The transmission signal is generated having a first phase depending on the first logic level during the first time segments, a second phase depending on the second logic level during the second time segments, and the second phase during a time interval preceding the transmission frame.

22 Claims, 2 Drawing Sheets

RADIO-FREQUENCY IDENTIFICATION TRANSPONDER AND METHOD FOR SENDING A RADIO-FREQUENCY IDENTIFICATION MESSAGE

CROSS-REFERENCE TO RELATED APPLICATIONS

This application claims priority to European Patent Application No. 16165320.9, filed on Apr. 14, 2016, which application is hereby incorporated herein by reference.

TECHNICAL FIELD

The invention relates to a radio-frequency identification (RFID) transponder and, in particular embodiments, to an active load modulation (ALM) RFID transponder and to a method for sending an RFID message from an RFID transponder to a reader.

BACKGROUND

RFID technology is for example used for communication between an RFID transponder and a reader, in particular an RFID reading device. For example magnetic coupling between an antenna of the RFID transponder and an antenna of the reader is established. Communication is performed for example by means of radio-frequency, RF, fields with a frequency in the order of MHz, for example at 13.56 MHz. ALM RFID transponders communicate to the reader by generating a transmission signal to modulate a reader antenna signal on a reader antenna.

In order to reduce space consumption, RFID transponders with very small dimensions and consequently very small antenna sizes are required. A drawback of such small transponder antennas is a reduction of a possible operating range due to a limited load modulation amplitude at the reader antenna. Consequently, a reduction of the antenna size is limited in existing transponders.

In some existing approaches, transmission from the RFID transponder to the reader may be active only during times corresponding to modulation periods in passive load modulation devices. Such approaches may suffer from a reduced load modulation amplitude. In other approaches, the transmission may be active also during times corresponding to non-modulation periods in passive load modulation devices to increase the load modulation amplitude. A drawback of such approaches may be that more than two amplitude levels of the reader antenna signal may be caused. Therefore, the reader may have difficulties to correctly demodulate the reader antenna signal, which may lead to an increased error rate in the communication.

Furthermore, in existing approaches, an absolute value of a change, in particular an amplitude change, of the reader antenna signal at the beginning of a transmission frame may be different from an absolute value of the amplitude change of the reader antenna signal caused by modulation during the transmission frame. This may lead to an increased error rate for detecting a start of a message or to a reduced success rate of transponder reply detection.

SUMMARY

Embodiments of the invention provide an improved concept for RFID communication reducing errors in communication and/or the detection of the start of a message, while allowing for an increased operating range at the same time.

According to the improved concept, ALM is used for sending a message, in particular an RFID message, from an RFID transponder to a reader during a transmission frame. An encoded bit signal changes during the transmission frame between a first logic level and a second logic level, wherein the encoded bit signal has the first logic level at the beginning of the transmission frame. A transmission signal is generated during the transmission frame having a first phase when the encoded bit signal has the first logic level and having a second phase when the encoded bit signal has the second logic level. During a time interval preceding the transmission frame, the transmission signal is generated having the second phase.

In this way, it may be achieved that an amplitude value of a reader antenna signal on an antenna of the reader during the time interval preceding the transmission frame is the same as when the encoded bit signal has the second logic level during the transmission frame.

According to the improved concept, an RFID transponder is provided. The RFID transponder is configured to send a message to a reader, in particular an RFID reader or RFID interrogator, during a transmission frame using active load modulation (ALM). The transponder comprises a coding and modulation unit designed to generate a transmission signal based on an encoded bit signal. The encoded bit signal has a first logic level during first time segments within the transmission frame and a second logic level during second time segments within the transmission frame. Therein, the first time segments comprise an initial time segment of the transmission frame.

The transmission signal is generated having a first phase depending on the first logic level during the first time segments, in particular during each of the first time segments, and a second phase depending on the second logic level during the second time segments, in particular during each of the second time segments. Furthermore, the transmission signal is generated having the second phase during a time interval preceding the transmission frame. The first and the second phase differ for example by a predefined phase difference.

The initial time segment begins at the same time as the transmission frame. In particular, a starting time of the initial time segment is equal to a starting time of the transmission frame. Consequently, the transmission signal has the first phase directly after the start of the transmission frame. The phase of the transmission signal changes from the first to the second phase at the end of the initial time segment, in particular at a starting time of one of the second time segments following, in particular directly following, the initial time segment.

The sending of the message may begin with the transmission frame. In particular, no part of the message is being transmitted during the time interval preceding the transmission frame.

The time interval preceding the transmission frame ends when the transmission frame starts, in particular an end time of the time interval preceding the transmission frame is equal to the starting time of the transmission frame.

In some implementations, the time interval preceding the transmission frame starts at a predefined starting time of the time interval preceding the transmission frame.

The starting time of the preceding time interval may for example be predefined with respect to the starting time of the transmission frame. Then, the starting time of the preceding time interval lies for example a predefined period of time before the starting time of the transmission frame.

In some implementations, the transmission frame corresponds to a reply frame in response to a request of the reader.

In some implementations, the starting time of the preceding time interval may for example be predefined with respect to the request of the reader. Then, the starting time of the preceding time interval lies for example a predefined period of time after the request of the reader.

The reader antenna signal may have a first modulated value, in particular a first modulated amplitude value, during the first time segments within the transmission frame and a second modulated value, in particular a second modulated amplitude value, during the second time segments within the transmission frame. A difference between the first and the second modulated value of the reader antenna signal may origin from the phase difference between the first and the second phase of the transmission signal. Since the transmission signal is generated having the second phase during the time interval preceding transmission frame, the reader antenna signal may have the second modulated value also during the preceding time interval.

Consequently, considering the time interval preceding the transmission frame and the first and the second time segments within the transmission frame, the reader antenna signal change only between two different values, in particular amplitude values. Therefore, an error rate of the communication between the RFID transponder and the reader, in particular an error rate when demodulating the reader antenna signal, may be decreased by means of the improved concept. At the same time, since the transmission signal is generated during the first time segments as well as during the second time segments, the ALM amplitude may be increased, leading for example to an increased operating range.

Furthermore, a change, in particular an amplitude change, for example an absolute value of the amplitude change, of the reader antenna signal at the starting time of the transmission frame may be equal to a change of the reader antenna signal at a transition between one of the first time segments and one of the second time segments within the transmission frame, in particular at a transition from one of the second time segments to one of the first time segments. Hence, a detection of a start of the message by the reader may be improved and an error rate for detecting the start of the message may be decreased.

According to some implementations, the coding and modulation unit is designed to generate the transmission signal by modulating an oscillator signal with the encoded bit signal, the oscillator signal.

According to some implementations, the transmission signal has an oscillator frequency of the oscillator signal or approximately the oscillator frequency during the first and the second time segments and during the time interval preceding the transmission frame.

According to several implementations, the first logic level corresponds to logic high and the second logic level corresponds to logic low or vice versa during the transmission frame. In particular, the first logic level may correspond to logic high during the transmission frame and to logic low during a further transmission frame or vice versa. The same holds analogously for the second logic level.

According to several implementations, the first phase corresponds to a phase of the oscillator signal or has a defined constant relation with respect to the phase of the oscillator signal.

In some implementations, the predefined phase difference between the first and the second phase is equal to 180° or approximately 180°.

According to several implementations, the predefined phase difference is generated by means of an inverter circuitry of the RFID transponder, for example of the coding and modulation unit.

According to several implementations, a value of the encoded bit signal is constant or approximately constant during each of the first and the second time segments.

According to several implementations of the RFID transponder, the RFID transponder is implemented as a near field communication, NFC, transponder.

According to several implementations, the oscillator frequency is equal to or approximately equal to 13.56 MHz. Such transponders may be denoted as high-frequency, HF, RFID transponders.

According to several implementations, the coding and modulation unit is designed to generate the encoded bit signal based on a data bit signal, wherein the data bit signal represents data to be transmitted by the RFID transponder to the reader, in particular represents the message.

According to several implementations, the RFID transponder comprises an antenna system and a front end circuitry connected to the antenna system. The antenna system and the front end circuitry are configured to generate a transmission radio frequency, RF, field based on the transmission signal.

The transmission RF field may modulate the reader antenna signal for example by inducing a signal change of the reader antenna signal, in particular by magnetic coupling. In this way, the transmission RF field may be detected by the reader. Consequently, data, in particular the message, may be transmitted from the RFID transponder to the reader.

According to several implementations, the RFID transponder is configured to operate in accordance with an industrial standard. In some implementations, the RFID transponder is configured to operate in accordance with an industrial standard with respect to generating the encoded bit signal based on the data bit signal. The industrial standard may for example be a standard according to ISO/IEC 14443 Type A, ISO/IEC 14443 Type B, JIS.X.6319-4 or another suitable standard.

According to several implementations, the coding and modulation unit is designed to apply a predefined coding algorithm to the data bit signal for generating the encoded bit signal.

According to some implementations, the encoded bit signal is given by the data bit signal encoded by means of a Manchester coding algorithm. Such implementations may for example correspond to implementations wherein the RFID transponder is configured to operate in accordance with the JIS.X.6319-4 standard.

According to several implementations, the coding and modulation unit is designed to generate the encoded bit signal based on the data bit signal and a subcarrier signal, wherein the subcarrier signal is a binary clock signal with a subcarrier frequency being smaller than the oscillator frequency. The subcarrier frequency may for example be equal to or approximately equal to 847.5 MHz or 848 MHz.

According to several implementations, the encoded bit signal corresponds to the subcarrier signal with a phase, in particular a code phase, depending on a logic level of the data bit signal.

According to some implementations, the coding and modulation unit is designed to generate the encoded bit signal by modulating the subcarrier signal depending on the data bit signal according to phase shift keying (PSK) in particular according to binary phase shift keying (BPSK). Such implementations may for example correspond to implementations wherein the RFID transponder is configured to operate in accordance with the ISO/IEC 14443 Type B standard.

According to some implementations, a length of the time interval preceding the transmission frame is greater than a specified minimum recovery time.

According to some implementations, the minimum recovery time corresponds to a time required by the reader to recover from noise or an error.

According to some implementations, the minimum recovery time is specified by a transmission protocol for the communication between the RFID transponder and the reader or between a passive load modulation RFID transponder and the reader.

The minimum recovery time may for example be specified in the transmission protocol for the sake of error reduction, in particular in passive load modulation systems. Passive transponders may extract their power supply from a signal induced on their antenna by a reader field. During data processing, which may start in a passive transponder after a reader command has been received, current consumption in the passive transponder may increase. The passive transponder supply current is for example supplied in pulses synchronous to an internal clock used for data processing. A variation of passive transponder current consumption may be misinterpreted as load modulation by the reader and may therefore be misinterpreted as start of the passive transponder reply.

According to a first example, the minimum recovery time may be specified by the "EMV® Contactless Specifications for Payment Systems". The minimum recovery time may for example correspond to the time $t_{RECOVERY}$ of said specification as on pages 182, 202 and 210 of "Book D—EMV Contactless Communication Protocol Specification", for example version 2.3, February 2013 of the specification.

The EMVco contactless specification may for example require that a reader is able to receive a frame at $t_{RECOVERY}$=1280/(13.56 MHz) after a noise or corrupted frame has been received.

According to a second example, the minimum recovery time may be specified by the International Standard ©ISO/IEC 14443-3. The minimum recovery time may for example correspond to one of the low EMD times $t_{E,PICC}$ or $t_{E,PCD}$ as specified in Amendment 1 dated Oct. 15, 2011 to the Second Edition of said standard dated Apr. 15, 2011.

The low EMD time may be a time before a start of a transponder reply frame or the transmission frame during which a passive transponder may not be allowed to emit a load modulation signal above a specified value. Further, the reader may have to be able to receive the reply frame or transmission frame in case a frame with errors was detected right before the low EMD time period.

The examples for the minimum recovery time are not to be considered limiting and may be adapted to an actual implementation of the RFID transponder as recognized by the skilled reader.

According to further implementations, the minimum recovery time may be specified in any suitable way by another industrial or proprietary standard for communication between the RFID transponder and the reader.

If the length of the preceding time interval is greater than the specified minimum recovery time, it may be ensured that perturbations in the reader antenna signal due to a start of generation of the transmission signal during the preceding time interval do not influence the communication or the sending of the message during the transmission frame, since the reader may have enough time to recover from the perturbations. In particular, perturbations or errors when detecting the start of the message by the reader may be avoided.

According to some implementations, the coding and modulation unit is designed to ramp up an amplitude of the transmission signal from a reduced value to a full value during a ramp-up interval within the interval preceding the transmission frame. A length of the ramp-up interval corresponds for example to a time needed for ramping up the amplitude from the reduced value to the full value.

The full value corresponds for example to an amplitude of the transmission signal during the transmission frame, in particular during the second time segments, for example during the first and the second time segments.

According to some implementations, the amplitude of the transmission signal reaches the full value at or before the starting time of the transmission frame.

According to some implementations, the reduced value is equal to zero or equal to a value between zero and the full value.

According to some implementations, the ramp-up interval is longer than a predefined minimum period for transitions of the encoded bit signal between the first and the second logic level.

Transitions of the encoded bit signal between the first and the second logic level may occur at most with a specified maximum transition frequency. The predefined minimum period is for example given by an inverse of the maximum transition frequency. The maximum transition frequency may for example be given by the subcarrier frequency or by a Manchester coding frequency.

The reader may contain filters, which may pass only signals within an expected band. In case of RFID systems compliant to the ISO 14443 standard, for example a 848 kHz subcarrier frequency may be used for the communication between transponder and reader for bit rates of 106 kb/s, 212 kb/s, 424 kb/s and/or 848 kb/s. Thus, the reader may for example reject frequency components below 848 kHz. If the transmission signal is ramped up from the reduced to the full value for example within a time which is equal to one, two or more than two periods of the subcarrier, the ramping may therefore not be recognized by the reader.

Since the ramp-up interval is longer than the predefined minimum period, the reader may not be disturbed, in particular may reject or may not recognize a change of the reader antenna signal due to the ramping up of the transmission signal during the ramp-up interval. Consequently, perturbations in the reader antenna signal due to the start of generation of the transmission signal during the preceding time interval may be avoided. In particular, perturbations or errors when detecting the start of the message by the reader and/or when sending the message during the transmission frame may be avoided.

According to some implementations, the first time segments comprise a final time segment of the transmission frame and the transmission signal is generated having the second phase during a time interval succeeding the transmission frame.

According to some implementations, the second time segments comprise the final time segment of the transmission frame and the transmission signal is generated having the first phase during the time interval succeeding the transmission frame.

The final time segment ends together with the transmission frame. In particular, an end time of the final time segment is equal to an end time of the transmission frame. Consequently, the phase of the transmission signal changes from the first phase to the second phase or vice versa at the end of the transmission frame.

The sending of the message ends with the transmission frame. In particular, no part of the message is being transmitted during the time interval succeeding the transmission frame.

The time interval succeeding the transmission frame starts when the transmission frame ends. In particular, a starting time of the time interval succeeding the transmission frame is equal to the end time of the transmission frame.

If the transmission signal is generated with its phase changing from the first phase to the second phase or vice versa at the end of the transmission frame, also the reader antenna signal may correspondingly change from the first modulated value to the second modulated value, or vice versa, at the end of the transmission frame.

Consequently, considering the time intervals preceding and succeeding the transmission frame and the first and the second time segments within the transmission frame, the reader antenna signal may have only two different values, in particular amplitude values. Therefore, an error rate of the communication between the RFID transponder and the reader, in particular an error rate when demodulating the reader antenna signal, may be further decreased. Furthermore, a change, in particular an amplitude change, for example an absolute value of the amplitude change, of the reader antenna signal at the end time of the transmission frame may be equal to the change of the reader antenna signal at a transition between one of the first time segments and one of the second time segments within the transmission frame. Hence, a detection of an end of the message by the reader may be improved and an error rate for detecting the end of the message may be decreased.

According to some implementations, a length of the time interval succeeding the transmission frame is greater than the specified minimum recovery time. It is referred to the explanations regarding the length of the preceding time interval in this respect.

According to some implementations, the coding and modulation unit is designed to ramp down the amplitude of the transmission signal from the full value to a first further reduced value during a ramp-down interval within the time interval succeeding the transmission frame. A length of the ramp-down interval corresponds for example to a time needed for ramping down the amplitude from the full value to the first further reduced value.

According to some implementations, the first further reduced value is equal to zero or equal to a value between zero and the full value.

According to some implementations, the ramp-down interval is longer than the predefined minimum period for transitions of the encoded bit signal between the first and the second logic level.

According to some implementations, the transmission frame comprises a further time segment in addition to the first and the second time segments. The encoded bit signal may have the first or the second logic level during the further time segment.

According to some implementations, the transmission signal, in particular the generation of the transmission signal, is paused at least during a part of the further time segment.

According to some implementations, the further time segment corresponds to a silence period according to a Manchester code.

According to some implementations, the encoded bit signal has the second logic level during the further time segment and the coding and modulation unit is designed to generate the transmission signal having the second phase at least during a part of the further time segment.

According to some implementations, the encoded bit signal has the first logic level during the further time segment and the coding and modulation unit is designed to generate the transmission signal having the first phase at least during a part of the further time segment.

According to some implementations, the transmission signal is generated continuously during the further time segment.

According to some implementations, the coding and modulation unit is designed to ramp up the transmission signal during a final portion of the further time segment from a second further reduced value to the full value. The second further reduced may be zero or a value between zero and the full value.

In some implementations, the coding and modulation unit is designed to ramp down the transmission signal during an initial portion of further time segment from the full value to the second or to a third further reduced value. The third further reduced may be zero or a value between zero and the full value.

In some implementations the transmission frame consists of the first and the second time segments.

According to the improved concept, also a method for sending a message from the RFID transponder to a reader, in particular an RFID reader, during a transmission frame using ALM is provided. The method comprises generating a transmission signal based on an encoded bit signal. The encoded bit signal has a first logic level during first time segments within the transmission frame and a second logic level during second time segments within the transmission frame. Therein, the first time segments comprise an initial time segment of the transmission frame.

The transmission signal is generated having a first phase depending on the first logic level during the first time segments and a second phase depending on the second logic level during the second time segments. Furthermore, the transmission signal is generated having the second phase during a time interval preceding the transmission frame.

Further implementations of the method are readily derived from the various implementations of the RFID transponder and vice versa.

For further details regarding the method, it is referred to the explanations with respect to the RFID transponder according to the improved concept.

BRIEF DESCRIPTION OF THE DRAWINGS

In the following, the invention is explained in detail with the aid of exemplary implementations by reference to the drawings. Components that are functionally identical or have an identical effect may be denoted by identical references.

Identical components and/or components with identical effects may be described only with respect to the figure where they occur first and their description is not necessarily repeated in subsequent figures.

In the drawings.

The following reference symbols can be used in conjunction with the drawings:

A antenna of transponder
FE front end circuitry
CLK clock circuit
CMU coding and modulation unit
SD data bit signal
SE encoded bit signal
ST transmission signal
SO oscillator signal
SR reconstructed reader signal
SRA reader antenna signal
S1 initial time segment
S3 final time segment
S2, S4 time segments
TFS starting time of transmission frame
TFE end time of transmission frame
TR minimum recovery time
PI preceding time interval
SI succeeding time interval
V0 unmodulated value
V1, V2 modulated values
RU ramp-up interval

DETAILED DESCRIPTION OF ILLUSTRATIVE EMBODIMENTS

Figure 1:
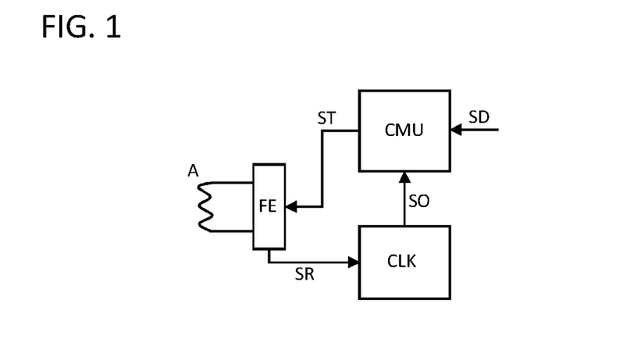
FIG. 1 shows an exemplary implementation of an RFID transponder according to the improved concept.

FIG. 1 shows an exemplary implementation of an RFID transponder according to the improved concept. The RFID transponder comprises a front end circuitry FE and an antenna system A connected to the front end circuitry FE. The RFID transponder further comprises a clock circuit CLK connected to the front end circuitry FE and a coding and modulation unit CMU connected between the clock circuit CLK and the front end circuitry FE.

The antenna system A may for example be configured to detect a radio-frequency, RF, field, for example generated by a reader (not shown), in particular an RFID reader, communicating with the RFID transponder. The antenna system A and the front end circuitry FE may for example generate a reconstructed reader signal SR based on the detected RF field. The reconstructed reader signal SR may be supplied to the clock circuit CLK.

The clock circuit CLK may generate an oscillator signal SO for example based on, in particular temporarily based on, the reconstructed reader signal SR, the oscillator signal SO having an oscillator frequency. For example, the oscillator frequency may be given by or approximately given by 13.56 MHz. The clock circuit CLK supplies the oscillator signal SO for example to the coding and modulation unit CMU. Furthermore, the coding and modulation unit CMU may receive a data bit signal SD for example from a further component (not shown) of the RFID transponder. The data bit signal SD represents for example data, in particular a message, to be transmitted by the RFID transponder to the reader. Based on the data bit signal SD, the coding and modulation unit CMU may generate for example an encoded bit signal SE.

For generating the encoded bit signal SE, the coding and modulation unit CMU may for example apply a predefined coding algorithm, for example a Manchester coding algorithm, to the data bit signal SD. Alternatively or in addition, the coding and modulation unit CMU may generate the encoded bit signal SE based on the data bit signal SD and a subcarrier signal. The subcarrier signal may for example be a binary clock signal with a subcarrier frequency being smaller than the oscillator frequency.

The coding and modulation unit CMU is further configured to generate a transmission signal ST based on the encoded bit signal SE, in particular by modulating the oscillator signal SO with the encoded bit signal SE.

The coding and modulation unit CMU may supply the transmission signal ST to the front end circuitry FE. Based on the transmission signal ST, the front end circuitry FE and the antenna system A may generate a transmission RF field. A reader antenna signal SRA on an antenna of the reader may be modulated according to the transmission RF field. In this way, the message may for example be sent from the RFID transponder to the reader.

A requirement of ALM may be that a phase difference between a signal induced by the reader and a signal generated by the RFID transponder is for example constant or approximately constant during each transmission frame during which a message may be sent from the RFID transponder to the reader. In some implementations according to the improved concept, the oscillator signal SO is for example in phase with the reconstructed reader signal SR continuously during each transmission frame. In particular, a synchronization of the clock signal SO with the reconstructed reader signal SR may for example not take place within a transmission frame.

For further details regarding the operation of the RFID transponder, in particular on the generation of the transmission signal ST by the coding and modulation unit CMU, it is referred to FIGS. 2A through 4B.

Figure 2A:
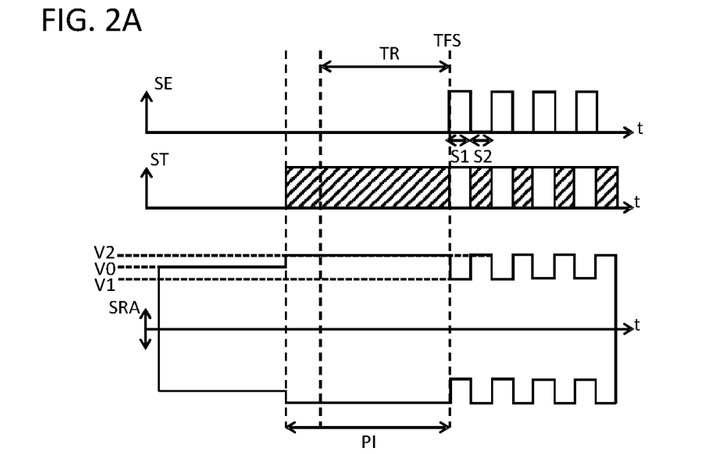
FIG. 2A shows signal sequences as a function of time occurring in an exemplary implementation of an RFID transponder according to the improved concept and a reader.

FIG. 2A shows signal sequences as a function of time occurring in an exemplary implementation of an RFID transponder according to the improved concept, for example an RFID transponder as shown in FIG. 1, and a reader. In particular, the encoded bit signal SE, the transmission signal ST and the reader antenna signal SRA are shown schematically as a function of time t.

A message is to be sent from the RFID transponder to the reader during a transmission frame. The transmission frame starts at a starting time TFS. An end time of the transmission frame is not shown in FIG. 2A. Before the starting time TFS, the encoded bit signal SE is equal to zero. Within the transmission frame, that is after the starting time TFS, the encoded bit signal SE has a first logic level, for example logic high, during first time segments including an initial time segment S1. A starting time of the initial time segment S1 is equal to the starting time TFS of the transmission frame. During second time segments, including a time segment S2 following directly after the initial time segment S1, the encoded bit signal SE has a second logic level, for example logic low, being different from the first logic level.

The coding and modulation unit CMU may generate the transmission signal ST by modulating the oscillator signal SO with the encoded bit signal SE. In particular, during the first time segments, the transmission signal ST may comprise signal pulses (not shown) with a frequency given by the oscillator frequency and with a first phase. With respect to a phase of the oscillator signal SO, the first phase may for example be zero or approximately zero or given by a predefined constant value. During the second time segments, the transmission signal ST may comprise signal pulses (not shown) with a frequency given by the oscillator frequency and with a second phase. The second phase may have a predefined value with respect to the first phase, for example 180°. In FIG. 2A, blank segments of the transmission signal ST depict times where the transmission signal ST has the first phase, for example 0°, while shaded segments depict times where the transmission signal ST has the second phase, for example 180°.

During a time interval PI preceding the transmission frame, the coding and modulation unit CMU may generate the transmission signal ST having the second phase, in particular may generate the transmission signal ST the same way as during the second time segments. It is highlighted that the transmission frame has not begun yet during the preceding time interval PI and no message is sent from the RFID transponder to the reader during the preceding time interval PI.

In the lowest panel of FIG. 2A, a response of the reader antenna signal SRA to the transmission signal ST, in particular to the transmission RF field generated by the front end circuitry FE and the antenna system A based on the transmission signal ST, is shown schematically. In particular, only an amplitude value of the reader antenna signal SRA is shown, while individual oscillations of the antenna reader signal SRA are not shown for the sake of clarity. The oscillations of the antenna reader signal may for example have a frequency given by or approximately given by the oscillator frequency.

During times when the transmission signal ST is not generated, for example before the preceding time interval PI, the amplitude of the reader antenna signal SRA has an unmodulated value V0. Whenever the transmission signal ST is generated having the first phase, in particular during the first time segments, the amplitude of the reader antenna signal SRA has a first modulated value V1, which may be greater or less than the unmodulated value V0. In the example of FIG. 2A, the first modulated value V1 is less than the unmodulated value V0. Whenever the transmission signal ST is generated having the second phase, in particular during the second time segments and during the preceding time interval PI, the amplitude of the reader antenna signal SRA has a second modulated value V2, which may be different from the first modulated value V1 and may be less or greater than the unmodulated value V0. In the example of FIG. 2A, the second modulated value V2 is greater than the unmodulated value V0.

Is highlighted, that the exact differences between the unmodulated value V0 and the first and the second modulated values V1, V2, respectively, depend on the values of the first and the second phases, respectively. In implementations, where the phase difference between the first and the second phase is 180°, a difference between the first modulated value V1 and the unmodulated value V0 may have the same absolute value as a difference between the second modulated value V2 and the unmodulated value V0.

Importantly, since the transmission signal ST has the second phase during the preceding time interval PI, the reader antenna signal SRA has the same amplitude value during the preceding interval PI as during the second time segments. Consequently, considering the first time segments, the second time segments and the preceding time interval PI, the reader antenna signal SRA has only two different amplitude values, namely the first and the second modulated value V1, V2. Therefore, an error rate of the communication between the RFID transponder and the reader, in particular an error rate when demodulating the reader antenna signal, may be decreased.

Furthermore, an absolute change of the amplitude value of the reader antenna signal SRA is the same at the starting time TFS of the transmission frame and at transitions between the first and the second time segments within the transmission frame. Hence, error rate for detecting a start of the message may be decreased.

The length of the preceding time interval PI may for example be longer than a minimum recovery time TR. The minimum recovery time TR may for example correspond to a time required by the reader to recover from noise or an error. It may be specified for example by a proprietary or non-proprietary industrial standard.

Consequently, it may be avoided that perturbations in the reader antenna signal due to a start of generation of the transmission signal ST at the beginning of the preceding time interval influence the sending of the message during the transmission frame or detection of the start of the message. This may be especially beneficial for example in case of an ISO 14443 Type A 106 kb/s communication protocol, where a transponder reply may be expected in a narrow time slot and there may be no training sequence in the beginning of the message.

Figure 2B:
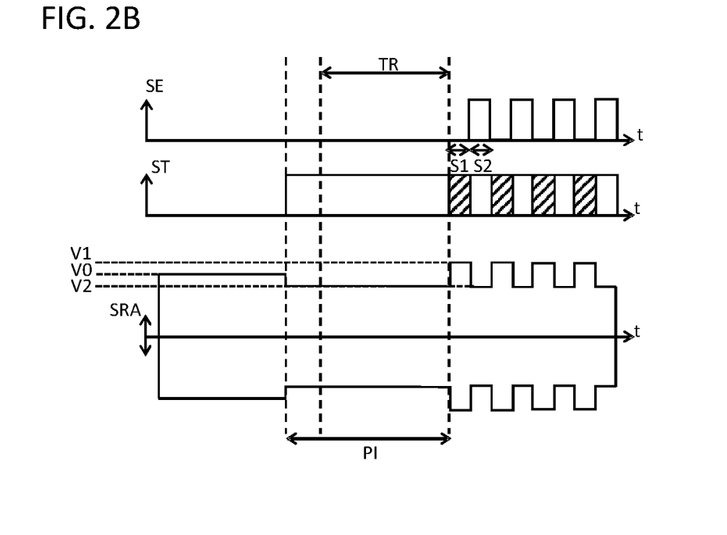
FIG. 2B shows signal sequences as a function of time occurring in a further exemplary implementation of an RFID transponder according to the improved concept and a reader.

FIG. 2B shows signal sequences as a function of time occurring in a further exemplary implementation of an RFID transponder according to the improved concept, for example an RFID transponder as shown in FIG. 1, and a reader.

In the example of FIG. 2B, the encoded bit signal SE is for example logic low during the first time segments and logic high during the second time segments. Consequently, the values of the first and the second phase may be switched compared to the example of FIG. 2A. For example, the second phase may be zero or approximately zero with respect to the oscillator signal SO, while the first phase may have a predefined value with respect to the second phase, for example 180°. In contrast to FIG. 2A, blank segments of the transmission signal ST depict times where the transmission signal ST has the second phase, for example 0°, while the shaded segments depict times where the transmission signal ST has the first phase, for example 180°, in FIG. 2B.

It follows that, referring to the explanations with respect to FIG. 2A, the first modulated value V1 of the reader antenna signal SRA may be greater than the unmodulated value V0, while the second modulated value V2 may be less than the unmodulated value V0.

Apart from these differences, the explanations regarding FIG. 2A hold analogously for FIG. 2B.

In particular, the examples of FIGS. 2A and 2B may correspond to the same exemplary implementation of an RFID transponder according to the improved concept, wherein the transmission frames of FIGS. 2A and 2B are different transmission frames.

Figure 3:
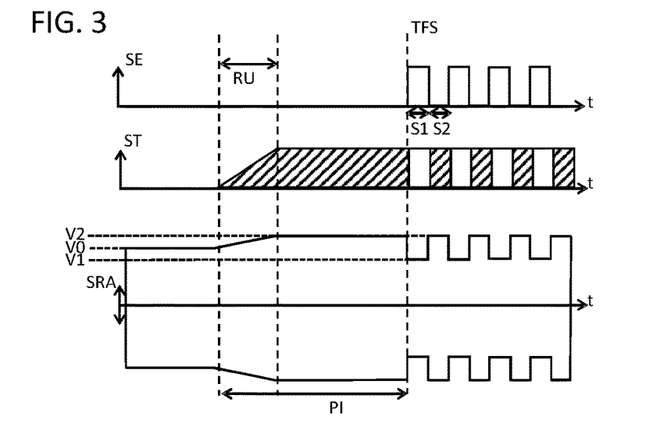
FIG. 3 shows signal sequences as a function of time occurring in a further exemplary implementation of an RFID transponder according to the improved concept and a reader.

FIG. 3 shows signal sequences as a function of time occurring in a further exemplary implementation of an RFID transponder according to the improved concept, for example an RFID transponder as shown in FIG. 1, and a reader. Implementation of FIG. 3 is for example based on the implementation explained with respect to FIG. 2A.

In the example of FIG. 3, the length of the preceding time interval PI is not necessarily longer than the minimum recovery time TR.

The transmission signal ST is ramped up for example from a reduced value, for example from zero, to its full value during a ramp-up interval RU within the preceding time interval PI, in particular at the beginning of the preceding time interval PI. The full value is for example equal to a value of the transmission signal ST during the second time segments. Consequently, the amplitude of the reader amplitude signal SRA ramps from the unmodulated value V0 to the second modulated value V2 during the ramp-up interval RU.

The ramp-up interval RU is for example longer than a predefined minimum period for transitions of the encoded bit signal SE between the first and the second logic level. The minimum period for transitions between the first and the second logic level is for example a specified minimum time for the encoded bit signal SE to change from the first logic level to the second logic level back to the first logic level and again to the second logic level. The specified minimum time may for example be given by an inverse of the subcarrier frequency.

Since the ramp-up interval RU is for example longer than the predefined minimum period, the change of the reader antenna signal SRA during the ramp-up interval RU may not be detected, for example may be filtered out or may be rejected, by the reader. Consequently, perturbations in the reader antenna signal SRA due to the start of the generation of the transmission signal ST may be avoided.

Figure 4A:
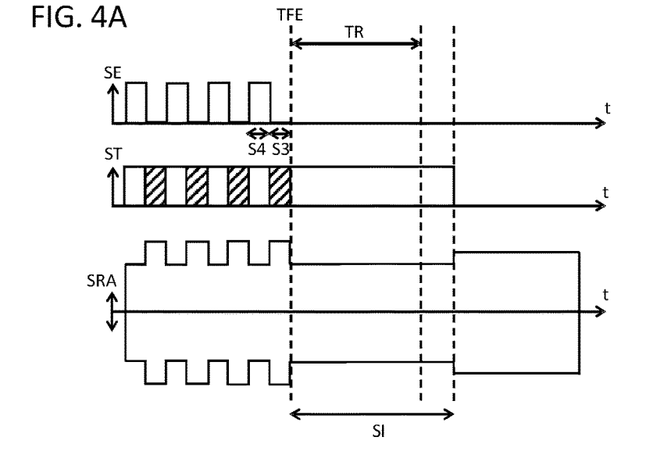
FIG. 4A shows signal sequences as a function of time occurring in a further exemplary implementation of an RFID transponder according to the improved concept and a reader.

FIG. 4A shows signal sequences as a function of time occurring in a further exemplary implementation of an RFID transponder according to the improved concept, for example an RFID transponder as shown in FIG. 1, and a reader.

According to FIG. 4A, a transmission frame ends at an end time TFE. The transmission frame of FIG. 4A may for example correspond to the transmission frame of one of FIG. 2A, 2B or 3. The starting time TFS of the transmission frame is not shown in FIG. 4A. In the following, it is assumed for explanatory reasons only that the transmission frame of FIG. 4A corresponds to the transmission frame of FIG. 2A or FIG. 3. However, the explanations are readily adapted to the example of FIG. 2B.

After the end time TFE, the encoded bit signal SE is for example equal to zero. In FIG. 4A, the second time segments include a final time segment S3 of the transmission frame. An end time of the final time segment S3 is equal to the end time TFE of the transmission frame. The first time segments include a time segment S4 preceding the final time segment S3. Thus, the encoded bit signal SE has the second logic level during the final time segment S3 and the first logic level during the time segment S4.

During a time interval SI succeeding the transmission frame, the coding and modulation unit CMU may generate the transmission signal ST having the first phase, in particular generate the transmission signal ST the same way as during the first time segments. It is highlighted, that the transmission frame has already ended during the succeeding time interval SI and no message is sent from the RFID transponder to the reader during the succeeding time interval SI.

Since the transmission signal ST has the first phase during the succeeding time interval SI, the reader antenna signal SRA has the same amplitude during the succeeding interval SI as during the first time segments, for example the first modulated value V1. Consequently, considering the first time segments, the second time segments and the succeeding time interval SI, the reader antenna signal SRA has only two different amplitude values, namely the first and the second modulated value V1, V2. Therefore, an error rate of the communication between the RFID transponder and the reader, in particular an error rate when demodulating the reader antenna signal SRA, may be decreased.

Furthermore, an absolute change of the amplitude value of the reader antenna signal SRA is the same at the end time TFE of the transmission frame and at transitions between the first and the second time segments within the transmission frame. Hence, error rate for detecting an end of the message may be decreased.

Figure 4B:
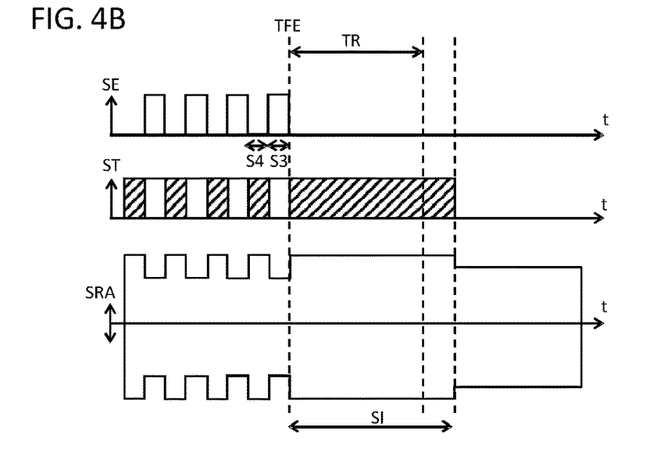
FIG. 4B shows signal sequences as a function of time occurring in a further exemplary implementation of an RFID transponder according to the improved concept and a reader.

FIG. 4B shows signal sequences as a function of time occurring in a further exemplary implementation of an RFID transponder according to the improved concept, for example an RFID transponder as shown in FIG. 1, and a reader.

According to FIG. 4B, a transmission frame ends at an end time TFE. The transmission frame of FIG. 4A may for example correspond to the transmission frame of one of FIG. 2A, 2B or 3. The starting time TFS of the transmission frame is not shown in FIG. 4B. In the following, it is assumed for explanatory reasons only that the transmission frame of FIG. 4B corresponds to the transmission frame of FIG. 2A or FIG. 3. However, the explanations are readily adapted to the example of FIG. 2B.

After the end time TFE, the encoded bit signal SE is for example equal to zero. In FIG. 4B, the first time segments include a final time segment S3 of the transmission frame. An end time of the final time segment S3 is equal to the end time TFE of the transmission frame. The second time segments include a time segment S4 preceding the final time segment S3. Thus, the encoded bit signal SE has the first logic level during the final time segment S3 and the second logic level during the time segment S4.

During a time interval SI succeeding the transmission frame, the coding and modulation unit CMU may generate the transmission signal ST having the second phase, in particular generate the transmission signal ST the same way as during the second time segments.

Since the transmission signal ST has the second phase during the succeeding time interval SI, the reader antenna signal SRA has the same amplitude during the succeeding interval SI as during the second time segments, for example the second modulated value V2.

In FIGS. 4A and/or 4B, the length of the succeeding time interval SI may for example be longer than the minimum recovery time TR.

Alternatively or in addition, the transmission signal ST may be ramped down during a ramp-down interval (not shown) within the succeeding interval SI, in particular at an end of the succeeding interval SI. In this respect, it is referred to the explanations regarding the ramping up according to FIG. 3, which hold analogously for the ramping down.

It is highlighted that, while in FIGS. 2A through 4B for example the amplitude of the antenna reader signal SRA is modulated due to the transmission signal ST, also a phase modulation or an amplitude and phase modulation may be achieved depending on the relations of the first and the second phase with respect to each other and/or with respect to the phase of the antenna reader signal SRA.

It is further pointed out that the drawings, in particular the differences between the unmodulated value V0 and the first and the second modulated value V1, V2 of the antenna reader signal SRA, are not necessarily drawn to scale.

By means of the improved concept, a high load modulation amplitude may be achieved without the drawbacks of existing approaches, such as reduced success rate of transponder reply or increased error rates during communication and when detecting the start of a message. In particular, due to the described generation of the transmission signal ST during the preceding time interval PI for example in combination with the generation of the transmission signal ST during the first as well as during the second time segments, said drawbacks may be overcome.

Furthermore, by using an RFID transponder or method according to the improved concept, there may be no need for an additional charge pump in the transponder to increase an overall signal amplitude, which could otherwise be necessary due to a too low load modulation amplitude.

What is claimed is:

1. A method for sending a message from a Radio Frequency Identification (RFID) transponder to a reader during a transmission frame using active load modulation, the method comprising:
   receiving an encoded bit signal, that has a first logic level during first time segments within the transmission frame and a second logic level during second time segments within the transmission frame, wherein the first time segments comprise an initial time segment of the transmission frame; and
   generating a transmission signal based on the encoded bit signal, wherein the transmission signal is generated having a first phase depending on the first logic level during the first time segments, a second phase depending on the second logic level during the second time segments, and the second phase during a time interval preceding the transmission frame, wherein a length of the time interval preceding the transmission frame is greater than a minimum recovery time.

2. The method according to claim 1, wherein the minimum recovery time corresponds to a time required by the reader to recover from noise or an error.

3. The method according to claim 1, wherein the minimum recovery time is specified by a transmission protocol for a communication between the RFID transponder and the reader.

4. The method according to claim 1, wherein the encoded bit signal has the second logic level during a further time segment of the transmission frame, the method further comprising generating the transmission signal having the second phase during at least a part of the further time segment.

5. The method according to claim 1, wherein the encoded bit signal has the first logic level during a further time segment, the method further comprising the transmission signal having the first phase during at least a part of a further time segment.

6. The method according to claim 1, wherein generating the transmission signal comprises generating the transmission signal by modulating an oscillator signal with the encoded bit signal.

7. The method according to claim 1, further comprising generating the encoded bit signal based on a data bit signal that represents the message.

8. A method for sending a message from a Radio Frequency Identification (RFID) transponder to a reader during a transmission frame using active load modulation, the method comprising:
   receiving an encoded bit signal, that has a first logic level during first time segments within the transmission frame and a second logic level during second time segments within the transmission frame, wherein the first time segments comprise an initial time segment of the transmission frame;
   generating a transmission signal based on the encoded bit signal, wherein the transmission signal is generated having a first phase depending on the first logic level during the first time segments, a second phase depending on the second logic level during the second time segments, and the second phase during a time interval preceding the transmission frame; and
   ramping up an amplitude of the transmission signal from a reduced value to a full value during a ramp-up interval within the time interval preceding the transmission frame, wherein the ramp-up interval is longer than a predefined minimum period for transitions of the encoded bit signal between the first and the second logic level.

9. A method for sending a message from a Radio Frequency Identification (RFID) transponder to a reader during a transmission frame using active load modulation, the method comprising:
   receiving an encoded bit signal, that has a first logic level during first time segments within the transmission frame and a second logic level during second time segments within the transmission frame, wherein the first time segments comprise an initial time segment of the transmission frame; and
   generating a transmission signal based on the encoded bit signal, wherein the transmission signal is generated having a first phase depending on the first logic level during the first time segments, a second phase depending on the second logic level during the second time segments, and the second phase during a time interval preceding the transmission frame, wherein generating the transmission signal comprises, during a time interval succeeding the transmission frame, generating the transmission signal to have the second phase if the first time segments comprise a final time segment of the transmission frame, and to have the first phase if the second time segments comprise the final time segment of the transmission frame.

10. The method according to claim 9, wherein a length of the time interval succeeding the transmission frame is greater than a minimum recovery time.

11. The method according to claim 9, further comprising ramping down an amplitude of the transmission signal from a full value to a further reduced value during a ramp-down interval within the time interval succeeding the transmission frame.

12. A Radio Frequency Identification (RFID) transponder configured to send a message to a reader during a transmission frame using active load modulation, the RFID transponder comprising:
   a coding and modulation unit configured to generate a transmission signal based on an encoded bit signal;
   wherein the encoded bit signal has a first logic level during first time segments within the transmission frame and a second logic level during second time segments within the transmission frame;
   wherein the first time segments comprise an initial time segment of the transmission frame; and
   wherein the transmission signal is generated having a first phase depending on the first logic level during the first time segments, a second phase depending on the second logic level during the second time segments, and the second phase during a time interval preceding the transmission frame, wherein the transmission signal having the first phase is configured to generate a first modulated value of an antenna signal of the reader, wherein the transmission signal having the second phase is configured to generate a second modulated value of the antenna signal of the reader, wherein the antenna signal of the reader has an unmodulated value prior to the time interval preceding the transmission frame, and wherein the first modulated value, the second modulated value, and the unmodulated value are different to each other.

13. The RFID transponder according to claim 12, further comprising an oscillator signal with an output configured to carry an oscillator signal, wherein the coding and modulation unit is configured to generate the transmission signal by modulating the oscillator signal with the encoded bit signal.

14. The RFID transponder according to claim 12, wherein the coding and modulation unit is designed to generate the encoded bit signal based on a data bit signal that represents the message.

15. The RFID transponder according to claim 12, wherein the transmission signal is generated having an amplitude that ramps from a reduced value to a full value during a ramp-up interval within the time interval preceding the transmission frame, and wherein the ramp-up interval is longer than a predefined minimum period for transitions of the encoded bit signal between the first and the second logic level.

16. The RFID transponder according to claim 15, wherein the predefined minimum period is given by an inverse of a subcarrier frequency.

17. The RFID transponder according to claim 12, wherein the coding and modulation unit is configured to generate, during a time interval succeeding the transmission frame, the transmission signal to have the second phase if the first time segments comprise a final time segment of the transmission frame, and to have the first phase if the second time segments comprise the final time segment of the transmission frame.

18. An active load modulation Radio Frequency Identification (RFID) transponder comprising:
a clock circuit;
a coding and modulation unit having a first input to receive a data bit signal that represents a message to be sent to a reader, a second input coupled to receive an oscillator signal from the clock circuit, wherein the coding and modulation unit is configured to generate a transmission signal based on an encoded bit signal that is based on the data bit signal, the encoded bit signal having a first logic level during first time segments within a transmission frame and a second logic level during second time segments within the transmission frame, wherein the first time segments comprise an initial time segment of the transmission frame, and wherein the transmission signal is generated having a first phase depending on the first logic level during the first time segments, a second phase depending on the second logic level during the second time segments, and the second phase during a time interval preceding the transmission frame; and
a front end circuit coupled to an output of the coding and modulation unit, wherein the coding and modulation unit is configured to generate, during a time interval succeeding the transmission frame, the transmission signal to have the second phase if the first time segments comprise a final time segment of the transmission frame, and to have the first phase if the second time segments comprise the final time segment of the transmission frame.

19. The transponder according to claim 18, further comprising an antenna coupled to the front end circuit.

20. The transponder according to claim 18, wherein a length of the time interval preceding the transmission frame is greater than a minimum recovery time.

21. The transponder according to claim 18, wherein the coding and modulation unit is configured to ramp up an amplitude of the transmission signal from a reduced value to a full value during a ramp-up interval within the time interval preceding the transmission frame.

22. The transponder according to claim 18, wherein the encoded bit signal has the second logic level during a further time segment of the transmission frame and the coding and modulation unit is configured to generate the transmission signal having the second phase during at least a part of the further time segment; or
wherein the encoded bit signal has the first logic level during the further time segment and the coding and modulation unit is configured to generate the transmission signal having the first phase during at least a part of a further time segment.

* * * * *